United States Patent
Silny et al.

(10) Patent No.: US 9,438,969 B2
(45) Date of Patent: Sep. 6, 2016

(54) OPTICAL MULTIPLEXOR SWITCH FOR FREE SPACE OPTICAL COMMUNICATION

(71) Applicant: RAYTHEON COMPANY, Waltham, MA (US)

(72) Inventors: John F. Silny, Playa Vista, CA (US); Gary D. Coleman, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/335,693

(22) Filed: Jul. 18, 2014

(65) Prior Publication Data

US 2016/0021436 A1  Jan. 21, 2016

(51) Int. Cl.
*H04Q 11/00* (2006.01)
*G02B 6/26* (2006.01)
*G02B 6/35* (2006.01)

(52) U.S. Cl.
CPC ........... *H04Q 11/0005* (2013.01); *G02B 6/262* (2013.01); *G02B 6/3518* (2013.01); *H04Q 2011/003* (2013.01); *H04Q 2011/0009* (2013.01); *H04Q 2011/0015* (2013.01); *H04Q 2011/0016* (2013.01); *H04Q 2011/0026* (2013.01); *H04Q 2011/0039* (2013.01);
(Continued)

(58) Field of Classification Search
CPC ............. H04Q 2011/0009; H04Q 2011/0016; H04Q 2011/0047
USPC .............................................. 398/48, 45, 43
See application file for complete search history.

(56) References Cited

U.S. PATENT DOCUMENTS

| 9,031,404 B2* | 5/2015 | Wagener | H04J 14/02 398/34 |
| 2007/0160321 A1* | 7/2007 | Wu | G02B 6/12021 385/24 |

(Continued)

FOREIGN PATENT DOCUMENTS

| WO | WO 01/45429 A2 | 6/2001 |
| WO | WO 02/37624 A2 | 5/2002 |
| WO | WO 2012/123715 A1 | 9/2012 |

OTHER PUBLICATIONS

Written Opinion of the International Searching Authority for International Application No. PCT/US2015/037544 filed Jun. 24, 2015, Written Opinion of the International Searching Authority mailed Oct. 28, 2015 (7 pgs.).

(Continued)

*Primary Examiner* — Oommen Jacob
(74) *Attorney, Agent, or Firm* — Lewis Roca Rothgerber Christie LLP (57) ABSTRACT

Device and method for optically switching a plurality of optical input signals include: receiving the plurality of optical input signals, wherein one or more of the optical input signals represent multiple channels at different channel frequencies; collimating the received plurality of optical input signals; removing noise between the channels by a comb filter; dispersing the collimated optical signals so that signals of different wavelength are separated by different angles; focusing the optical signals separated by different angles on a light switch device having a plurality of micromirrors; and controlling the light switch by a control signal to direct one or more of the optical signals separated by different angles to one or more output fibers for multicasting of the optical input signals.

18 Claims, 6 Drawing Sheets

(52) U.S. Cl.
CPC ............... *H04Q2011/0047* (2013.01); *H04Q 2011/0049* (2013.01)

(56) References Cited

U.S. PATENT DOCUMENTS

| | | | |
|---|---|---|---|
| 2009/0220233 A1* | 9/2009 | Presley | G02B 6/3544 398/79 |
| 2012/0128355 A1* | 5/2012 | Sakurai | G02B 6/356 398/48 |
| 2012/0236216 A1* | 9/2012 | Sharma | G02B 26/02 349/1 |
| 2013/0235444 A1* | 9/2013 | Matsuura | G02F 1/31 359/246 |
| 2013/0272650 A1 | 10/2013 | Ishikawa et al. | |
| 2014/0146395 A1* | 5/2014 | Wagener | G02B 27/1006 359/634 |
| 2015/0023662 A1* | 1/2015 | Suzuki | H04J 14/02 398/48 |
| 2016/0021436 A1* | 1/2016 | Silny | H04Q 11/0005 398/48 |

OTHER PUBLICATIONS

International Search Report for International Application No. PCT/US2015/037544, filed Jun. 24, 2015, International Search Report dated Oct. 15, 2015 and mailed Oct. 28, 2015 (4 pgs.).

\* cited by examiner

OPTICAL MULTIPLEXOR SWITCH FOR FREE SPACE OPTICAL COMMUNICATION

FIELD OF THE INVENTION

The present invention relates to free space optical communications and more specifically to an optical multiplexor switch for optical communications.

BACKGROUND

There is an increasing demand for optical networks and optical communication between nodes of such networks, due to the increased global demand for high speed data exchange. Such optical communication systems need one or more optical cross-connect switches at each node to switch the received optical signals to a desired destination node in the optical network. For example, a high bandwidth transparent optical communication network for a free space satellite communication system requires a high bandwidth optical switch to establish the proper connections on each satellite between input and output optical signals, and a filter to reduce Amplified Spontaneous Emission (ASE) noise. However, these various optical components increase the weight of the payload and reduce the performance of the optical switch.

There are several optical cross-connect switch designs that have been implemented for the ground fiber optics market. Moreover, optical demultiplexers and Fabry-Perot comb filters are known, but there has not been any attempt to develop an optical device that combines the full required (optical) capabilities of these various optical devices. Current Optical Cross-Connect (OXC) Switch technology has several limitations when considered for space systems. First, these systems are designed for use on the ground, where repair or replacement is possible. In space, graceful degradation is essential, with subsystems designed with enough redundancy that operation can continue as minor damage is inflicted by the environment, especially by the penetrating radiation. Future-proofing is even more important in space than on the ground, as each satellite needs to support a mean mission duration of at least 10 years, before being replaced by a new satellite.

Second, because of the large separation between satellites, the received signal strength is typically at least 70 dB weaker than the transmitted signal. This means that the signal must be amplified by at least that much before being relayed to the next node. ASE generated in the low-noise pre-amplifier needs to be suppressed as soon as possible, but the possibility that the channel spacing will need to change over time makes it impractical to use a conventional comb filter to eliminate the ASE. This includes matching the width of the communication channels as precisely as possible in the switch, and directing all photons in unused channels to a photon trap, which may use Carbon Nano-Tube (CNT) forests to absorb the highest possible fraction of those photons. A third limitation is the inability to perform multicasting or signal splitting. In some cases this can be deferred to a later signal splitter element in the output fiber lines, but this offers very limited flexibility.

SUMMARY

In some embodiments, the present invention is a method for optically switching a plurality of optical input signals. The method includes: receiving the plurality of optical input signals, wherein one or more of the optical input signals represent multiple channels at different channel frequencies; collimating the received plurality of optical input signals; removing noise between the channels by a comb filter, dispersing the collimated optical signals so that signals of different wavelength are separated by different angles; focusing the optical signals on a light switch device having a plurality of microelements, for example, micromirrors or micro-crystals, wherein the light from a channel on a single input fiber is spread over multiple microelements of the light switch; controlling the light switch by a control signal to direct one or more of the optical signals separated by different angles to one or more output fibers for multicasting of the optical input signals; and addressing the microelements to tailor a precise spectral limits of the channel and the fraction of the incident light being sent to each output fiber.

In some embodiments, the present invention is an optical device for optically switching a plurality of optical input signals. The optical device includes: a plurality of input fibers for receiving the plurality of optical input signals, wherein one or more of the optical input fibers represent multiple channels at different channel frequencies; a collimator for collimating the received plurality of optical input signals; a comb filter for removing noise between the channels; a dispersing element for dispersing the collimated optical signals so that signals of different wavelength are separated by different angles; a focusing element for focusing the optical signals separated by different angles, wherein the light from a channel on a single input fiber is spread over multiple microelements of the light switch; a light switch having a plurality of microelements for receiving the focused signals; and a controller for issuing a control signal to tilt a portion of the plurality of the elements to direct one or more of the optical signals separated by different angles to one or more output fibers for multicasting of the optical input signals, and for addressing the individual elements to tailor the precise spectral limits of the channel and the fraction of the incident light being sent to each output fiber.

In some embodiments, the light switch is a Digital Micromirror Device (DMD) including a plurality of micromirrors and the control signal tilts a portion of the plurality of the micromirrors to direct said one or more of the optical signals. In some embodiments, the light switch is an LCoS (liquid crystal on silicon) chip including a plurality of liquid crystal elements arranged in an array and the control signal controls phases of the liquid crystal elements to direct said one or more of the optical signals.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention combines the functions of high bandwidth optical switching and those of a comb filter to reduce weight and improve performance. Adding a demultiplexer enables the optical network to switch individual optical communication channels, rather than just switch bundles of channels.

In some embodiments, by combining a demultiplexer with a two-dimensional directional light switch with microelements, such as a Digital Micro-mirror Device (DMD), Optical Phased Array (OPA), Liquid Crystal on Silicon (LCoS) device, or component of similar functionality, the incoming bundles of optical channels can, if desired, be directed to different output paths. By choosing the same output path for different inputs, the device supports multiplexing output channels as desired, including mixing channels from different input fibers. The optical device of the present invention is inherently non-blocking, and offers two layers of noise filtering in some embodiments. The light switch can be used to simulate a programmable comb filter that suppresses Amplified Spontaneous Emission (ASE) noise between channels, while the light switch removes all in-channel noise for channels not actually carrying a desired signal, including noise on other input fibers at a selected channel.

Depending on the number of elements in the light switch and the input fiber dimension, and whether the comb filter or other optics broadens the spatial width of each input fiber signal, the device also offers multicasting, with selected portions of the input signal going to different output fibers. Additionally, in some embodiments, the optical device of the present invention offers redundancy to improve reliability and lifetime. Because each channel from a given input port is spread out over a number of individual elements in the light switch, the signal strength degrades gracefully as some number of these elements fail.

In some embodiments, the optical device of the present invention accepts N input fibers, each supporting multiple high speed optical signals at a subset of the available channel frequencies. The fibers are arranged in a vertical stack and could use a relatively low finesse common optical comb filter to filter out ASE noise between the channels, if the channel grid spacing will be unchanged over the lifetime of the system. In some embodiments, the filtering would be done by altering the region on the light switch that act together for each channel. The output optical signals are then collimated and directed toward a dispersing element, which might be either a reflection or transmission grating, so that the spectral dispersion is in the horizontal dimension, separating by angle the input channels. In some embodiments, the multiple spectra are directed toward a 2-dimensional light switch, which is configured so that the optical signal from a given input fiber at a given wavelength is directed toward a specific output fiber. The output fiber accepts optical inputs from any row and column of the light switch, with all channels from fibers which do not contain a signal at that wavelength directed to a photon trap. In some embodiments, the photon trap absorbs a high percentage of the photons, using a forest of carbon nano tubes (CNTs).

Figure 1:
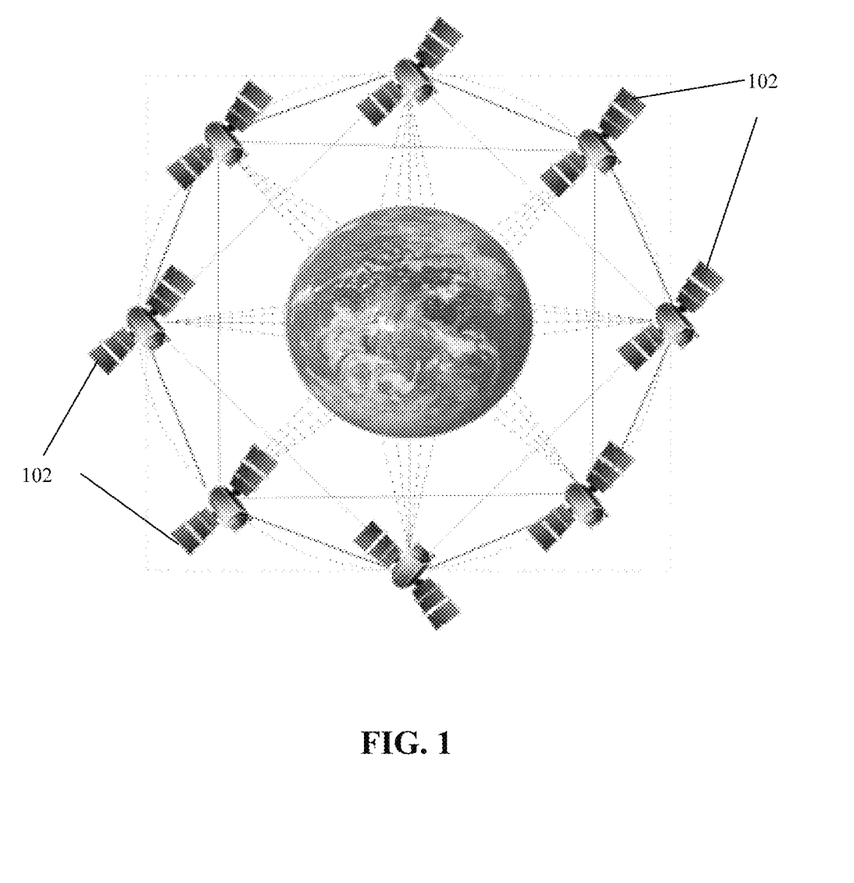
FIG. 1 shows an exemplary constellation of a plurality of satellites, each including one or more of the optical device according to some embodiments of the present invention.

FIG. 1 shows an exemplary constellation of a plurality of satellites, each including one or more of the optical device according to some embodiments of the present invention. As shown, eight satellites 102 (8-ball constellation) are arranged and networked together to provide a continuous coverage of a band of the earth. Each satellite of the constellation is optically coupled to multiple nearest neighbors (for example, 4 or more, except in the minimal 4-ball constellation, where only 2 neighbors are visible) using laser relay modules (LRMs) functioning as inter-satellite lasercom (ISL) optical relays. Each satellite includes one or more of the optical devices of the present invention for multiplexing and switching the (optical) data to the next (satellite) node, with the LRMs providing the input signals at the input ports and accepting the output signals at the output ports.

In some embodiments, circular polarization or spectral diversity is used to provide dual optical signal paths per telescope. In some embodiments, circular polarization is used to separate transmitted signals from received signals. Different spectral regions can also be used to allow four or more paths per ISL optical telescope, with minimal impact on the complexity of the network channel assignment. The ISL optical telescopes are capable of adjusting their elevation angle to allow (accommodate) a different angle of optical communication to accommodate adding or removing satellites (i.e., changes in the number of the satellites in the constellation) from the ring (constellation) and re-phasing the satellites that are currently in use.

Figure 2A:
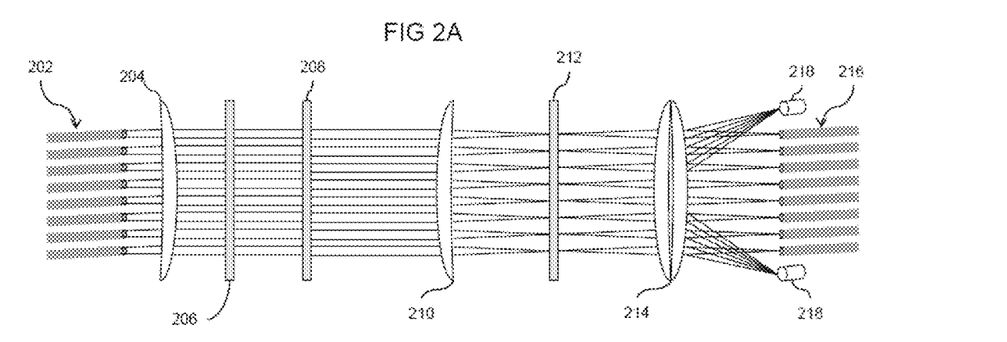
FIG. 2A is an exemplary block diagram of an optical demultiplexer, according to some embodiments of the present invention.

FIG. 2A is an exemplary block diagram of an optical demultiplexer, according to some embodiments of the present invention. As shown, a plurality of optical signals from several input fibers 202 are received by a collimator 204. Collimator 204 aligns the optical signals on an optional comb filter 206. If present, the optical comb filter (for example, based on Fabry-Perot or similar existing technology) removes noise between channels, but passes noise within channels, even those that do not contain any signal. The de-mux function of the dispersing element 208 creates a 2-dimensional grid of channel-fiber combinations, which are then imaged onto a light switch 212 via a focusing element 210 (for example, a lens), which focuses the separated colors onto the light switch 212.

In some embodiments, the light switch is a DMD chip, which includes several hundred thousand micromirrors arranged on its surface in an array. The micromirrors can be individually rotated to one of multiple different angles associated with "on" and "off" states. In the on state, light from a light source is reflected into the lens and directed into one of the output fiber bundles via relay lens element 214. In the off state, the light is directed to photon trap 218. The tilt of the individual micromirrors of the DMD corresponds to input signals that are controlled (for example, by a computer or processor) to pass through a relay element 214 and enter the desired output fibers 216. Additionally, any elements that do not correspond to an input signal are tilted to one or more photon traps 218 that eliminate the noise within those channels. In some embodiments, all or a portion of the micromirrors of the DMD are tilted corresponding to a control signal to direct one or more of the input signals to one or more output fibers, or to attenuate the signal to a desired level.

In some embodiments, the light switch is an LCoS chip, which includes a few million liquid crystal elements arranged in an array. The phase of the liquid crystal is controlled by electronics, with the elements in a particular block set to generate a phase tilt that either directs the light to the desired output fiber 216 or to a photon trap 218. The block of elements can be divided to support multicasting or to attenuate the output signal.

Accordingly, the noise on all unused channels on a given input fiber 202 is directed to the photon trap 218. If multi-casting, attenuation, or redundancy is desired, the number of light switch elements in the input fiber dimension can be increased. Currently available LCoS devices are capable of supporting a 3840×2160 grid of elements, and even higher resolution devices are anticipated.

Figure 2B:
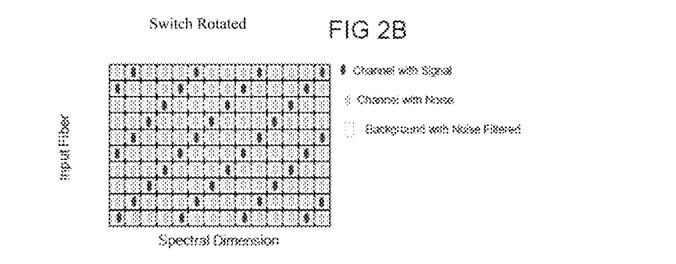
FIG. 2B is an exemplary depiction of the microelements of the light switch of FIG. 2A, according to some embodiments of the present invention.
Figure 3A:
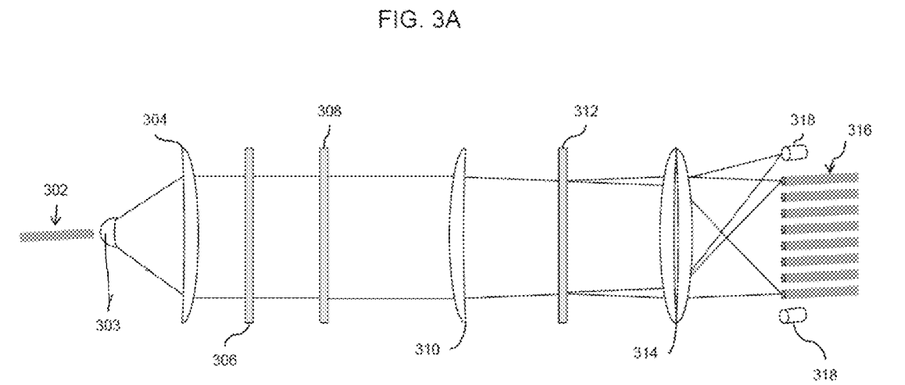
FIG. 3A is an exemplary block diagram of an optical demultiplexer, according to some embodiments of the present invention.

FIG. 2B is an exemplary depiction of the elements of the light switch of FIG. 2A, according to some embodiments of the present invention. As shown, channels with signals, channels with noise and background with the noise filtered are mapped onto a 2-D grid, with the channels from an individual input port distributed spectrally along the horizontal axis, and the same spectral channel from different input ports arranged vertically. The darker ellipses show where the energy from a given channel in use (i.e., with signal) would be mapped FIG. 3A is an exemplary block diagram of an optical demultiplexer, according to some embodiments of the present invention. As shown, a single input fiber 302 is received by a anamorphic lens 303. The anamorphic lens 303 spreads out the input optical signals in one plane and sends them to a collimator 304. The result is a highly elongated energy distribution for each channel on the light switch, which greatly increases the number of elements available to multicast the input, to provide redundancy and graceful degradation, and to control signal attenuation.

Collimator 304 aligns the optical signals on an optional comb filter 306. The optional comb filter 306 separates the colors in the aligned optical signals in different angles and removes the noise. The de-mux function of the dispersing element 308 creates a 2-dimensional grid of channel-fiber combinations, which are then imaged onto a light switch 312 via a focusing element 310, which focuses the separated colors onto the light switch 312.

In some embodiments, the light switch 312 is a DMD. The tilt of the individual DMD micromirrors corresponding to input signals are controlled (for example, by a computer or processor) to pass through a relay element 314 and enter the desired output fibers 316. For an LCoS light switch, the electronics control the orientation of the liquid crystals, which alters the phase shift of the element, which approximates a tilt. Any elements that do not correspond to an input signal are control to send incident photons to one or more photon traps 318 that eliminates the noise within those channels. These embodiments offer the ability to multicast. For example, each input signal split may be sent to multiple output fibers.

Figure 3B:
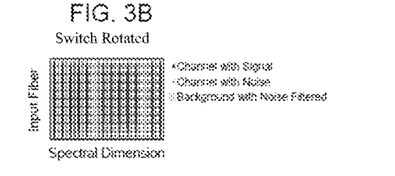
FIG. 3B is an exemplary depiction of the microelements of the light switch of FIG. 3A, according to some embodiments of the present invention.

FIG. 3B is an exemplary depiction of the microelements of the light switch of FIG. 3A, according to some embodiments of the present invention. As shown, channels with signals, channels with noise and background with the noise filtered are mapped onto a 2-D grid, with the channels from an individual input port distributed spectrally along the horizontal axis, and the same spectral channel from different input ports arranged vertically. The darker ellipses show where the energy from a given channel in use would be mapped. Since each input fiber is mapped to multiple microelements of the light switch (e.g., micromirrors of the DMD), input signals can be multi-cast and/or attenuated. Further, the input signals have the property of graceful degradation as the microelements of the light switch fail.

Figure 4A:
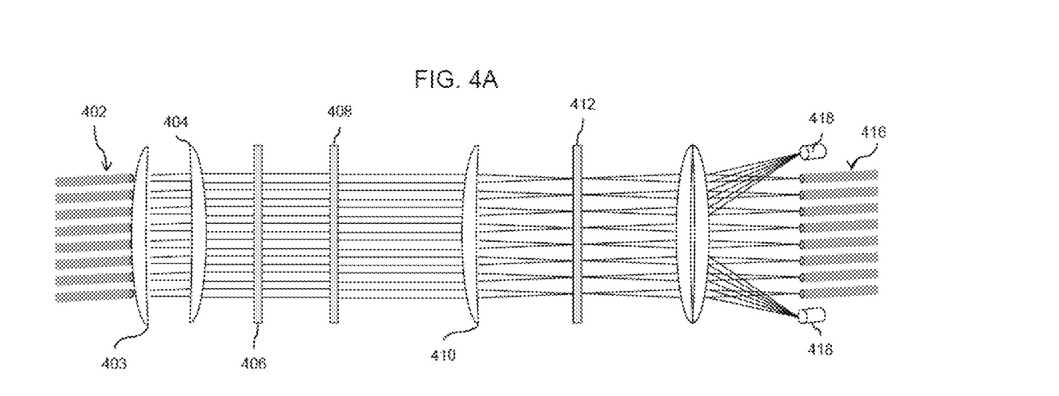
FIG. 4A is an exemplary block diagram of an optical demultiplexer, according to some embodiments of the present invention.

FIG. 4A is an exemplary block diagram of an optical demultiplexer, according to some embodiments of the present invention. These embodiments provide the same multicasting capabilities of those depicted in FIG. 3A, but with multiple input fibers. Here, the optical multiplexor utilizes an anamorphic lens 403 in combination with a collimator 404 to expand the beam from each input fiber to cover a few (not all) rows of the light switch 412. These embodiments provide limited multicasting (equivalent to the number of illuminated light switch elements) with in-channel noise suppression for all unused channels. The rest of the components/elements in FIG. 4A are similar to the corresponding ones in FIG. 3A.

Figure 4B:
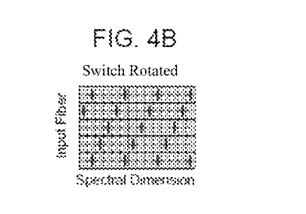
FIG. 4B is an exemplary depiction of the microelements of the light switch of FIG. 4A, according to some embodiments of the present invention.

FIG. 4B is an exemplary depiction of the elements of the light switch of FIG. 4A, according to some embodiments of the present invention. As shown, channels with signals, channels with noise and background with the noise filtered are mapped onto a 2-D grid, with the channels from an individual input port distributed spectrally along the horizontal axis, and the same spectral channel from different input ports arranged vertically. The darker ellipses show where the energy from a given channel in use would be mapped. As illustrated, each input fiber is mapped to a unique set of rows of the elements of the light switch.

Figure 4C:
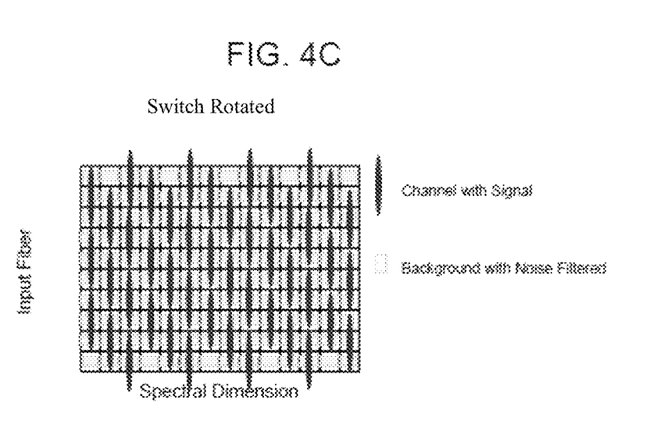
FIG. 4C is another exemplary depiction of the microelements of the light switch of FIG. 4A, according to some embodiments of the present invention.

In some embodiments, the optical device of FIG. 4A uses spacing rule(s) to allow more overlap in mapping of input fibers to light switch rows, as shown in FIG. 4C. The example shown expands the height of the energy pattern by a factor of 3, which requires that each input fiber must be restricted to one-third as many channels. This allows the use of a light switch with fewer elements, but with the same multicasting and less noise.

Figure 5:
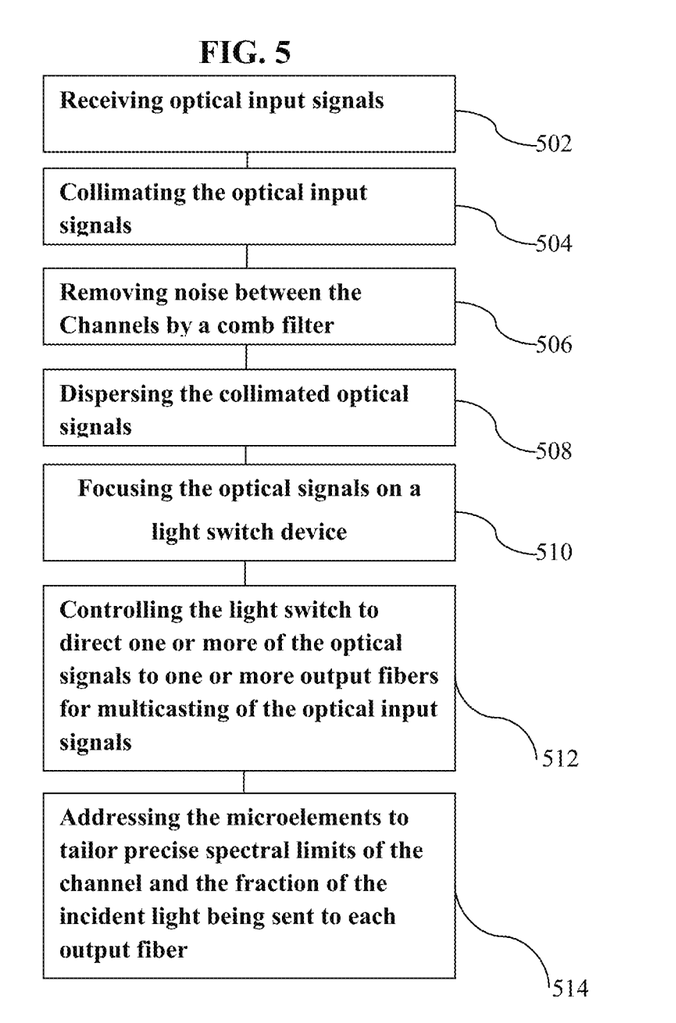
FIG. 5 is an exemplary process flow, according to some embodiments of the present invention.

FIG. 5 is an exemplary process flow, according to some embodiments of the present invention. The process flow illustrates a method for optically switching a plurality of optical input signals. As shown in block 502, the optical input signals are received, for example from a satellite, ground or other airborne platforms. The optical input signals may represent multiple channels at different channel frequencies. Further, each channel from a given input port may be spread out over a number of individual elements in the light switch. The received plurality of optical input signals are then collimated by a collimator in block 504. The collimated signal is a highly elongated energy distribution for each channel on the light switch, which greatly increases the number of elements available to multi-cast the input optical signals. In block 506, the noise between the channels is removed by a comb filter.

The collimated optical signals are then dispersed so that signals of different wavelength are separated by different angles, in block 508. In some embodiments, the color spectrums in the collimated optical signals may be separated in different angles. The optical signals separated by different angles are focused on a light switch device, which includes a plurality of microelements, typically in hundreds of thousands, in block 510. This way, the light from a channel on a single input fiber is spread over multiple microelements of the light switch, which enables multicasting, attenuation, and graceful degradation of the optical signals. In block 512, the light switch is controlled by a control signal to direct one or more of the optical signals separated by different angles to one or more output fibers for multicasting of the optical input signals. In block 514, the microelements are individually addressed to tailor a precise spectral limits of the channel and the fraction of the incident light being sent to each output fiber. This provides an alternate noise filtering approach.

In some embodiments, the multicasting is performed with the same portion of the input optical signal going to different output fibers. In some embodiments, the optical device of the present invention offers redundancy to improve reliability and lifetime. That is, there may be two or more output optical paths for the same optical input fiber or signal.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for optically switching a plurality of optical input signals, the method comprising:
   receiving the plurality of optical input signals, wherein one or more of the optical input signals represent multiple channels at different channel frequencies;
   spreading the received plurality of optical input signals by an anamorphic optical element;
   collimating the spread plurality of optical signals to a portion of rows of a light switch, wherein the light switch comprises of a single beam steering array having a plurality of microelements arranged in a horizontal direction and a vertical direction;
   dispersing the collimated optical signals so that signals of different wavelength are separated by different angles;
   focusing the optical signals on the light switch device, wherein the light from a channel on a single input fiber is spread over multiple microelements of the light switch;
   controlling the light switch by a control signal to direct one or more of the optical signals separated by different angles to one or more output fibers for multicasting of the optical input signals, wherein each of said one or more output fibers accepts optical inputs from any row and column of the light switch; and
   addressing the microelements to tailor a precise spectral limits of the channel, and to send a fraction of the incident light to each output fiber, and performing noise filtering by altering a region on the light switch that act together for each multiple channel.

2. The method of claim 1, wherein the light switch is a Digital Micro-mirror Device (DMD) including a plurality of micromirrors and the control signal tilts a portion of the plurality of the micromirrors to direct said one or more of the optical signals.

3. The method of claim 1, wherein the light switch is an LCoS chip including a plurality of liquid crystal elements arranged in an array and the control signal controls phases of the liquid crystal elements to direct said one or more of the optical signals.

4. The method of claim 1, wherein the light switch is an Optical Phased Array.

5. The method of claim 1, further comprising separating color spectrums in the collimated optical signals in different angles.

6. The method of claim 1, further comprising absorbing light from channel that do not contain signal by a light trap.

7. The method of claim 6, wherein the light trap is a plurality of carbon nano tubes.

8. The method of claim 1, further comprising mapping channels onto a two-dimensional grid, with the channels from an individual input port distributed spectrally along a horizontal axis, and the same spectral channel from different input ports arranged along a vertical axis.

9. The method of claim 1, further comprising performing wavelength division multiplexing to provide a plurality of communications channels at different wavelengths for the directed optical signals.

10. An optical device for optically switching a plurality of optical input signals comprising:
    a plurality of input fibers for receiving the plurality of optical input signals, wherein one or more of the optical input fibers represent multiple channels at different channel frequencies;
    an anamorphic lens for spreading the received plurality of optical input signals;
    a collimator for collimating the spread plurality of optical input signals;
    a dispersing element for dispersing the collimated optical signals so that signals of different wavelength are separated by different angles;
    a focusing element for focusing the optical signals separated by different angles, wherein the light from a channel on a single input fiber is spread over multiple microelements of the light switch;
    a light switch having a plurality of microelements arranged in a horizontal direction and a vertical direction for receiving the focused signals, wherein the collimator collimates the spread plurality of optical input signals to a portion of the rows of the microelements of the light switch via the dispersing element, wherein the light switch comprises of a single beam steering array having a plurality of microelements arranged in a horizontal direction and a vertical direction; and
    a controller for issuing a control signal to tilt a portion of the plurality of the elements to direct one or more of the optical signals separated by different angles to one or more output fibers for multicasting of the optical input signals, and for addressing the microelements to tailor a precise spectral limits of the channel and to send a fraction of the incident light to each output fiber, and performing noise filtering by altering a region on the light switch that act together for each multiple channel, wherein each of said one or more output fibers accepts optical inputs from any row and column of the light switch.

11. The optical device of claim 10, wherein the light switch is a Digital Micro-mirror Device (DMD) including a plurality of micromirrors and the control signal tilts a portion of the plurality of the micromirrors to direct said one or more of the optical signals.

12. The optical device of claim 10, wherein the light switch is an LCoS chip including a plurality of liquid crystal elements arranged in an array and the control signal controls phases of the liquid crystal elements to direct said one or more of the optical signals.

13. The optical device of claim 10, wherein the light switch is an Optical Phased Array.

14. The optical device of claim 10, further comprising a light trap for absorbing light from channels that do not contain a signal.

15. The optical device of claim 14, wherein the light trap is a plurality of carbon nano tubes.

16. The optical device of claim 10, further comprising a two-dimensional grid for having channels with noise mapped onto, with the channels from an individual input port distributed spectrally along a horizontal axis, and the same spectral channel from different input ports arranged along a vertical axis.

17. The optical device of claim 10, wherein the optical device is mounted on a satellite or airborne platform.

18. The optical device of claim 10, further comprising a Fabry-Perot filter.

* * * * *